May 8, 1951           H. E. NIELSEN           2,551,629
BRUSH AND BOG PLOW COULTER
Filed June 6, 1945
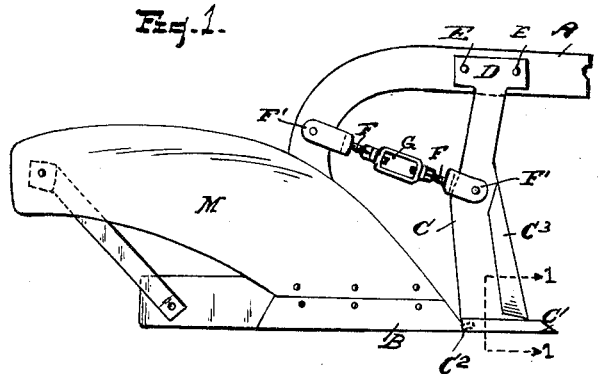
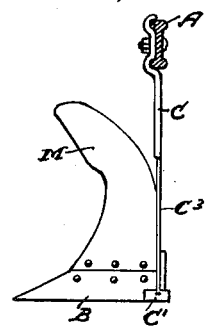
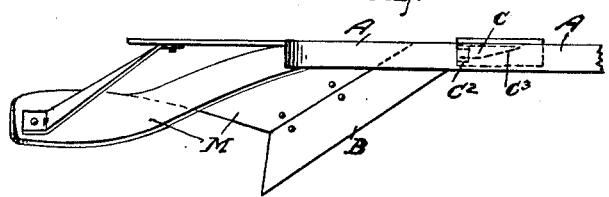
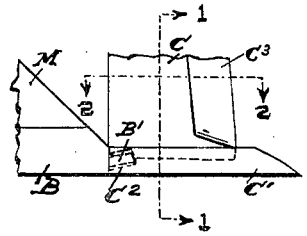
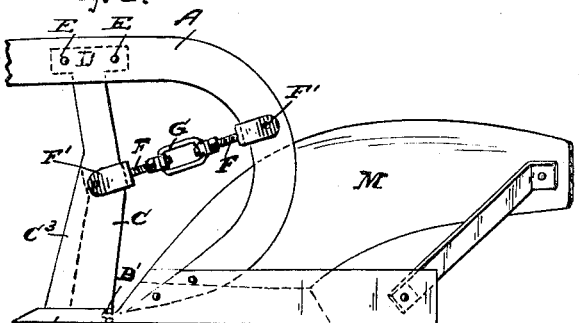
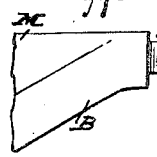
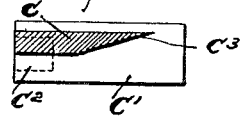
INVENTOR.
Harry E. Nielsen
BY
S. E. Thomas

Patented May 8, 1951

2,551,629

UNITED STATES PATENT OFFICE 2,551,629

BRUSH AND BOG PLOW COULTER

Harry E. Nielsen, West Dearborn, Mich.

Application June 6, 1945, Serial No. 597,904

1 Claim. (Cl. 97—208)

My invention relates to an improvement in plows, its object being to provide means which is particularly designed for use on virgin soil, where the top-soil has been left to grow brush and young trees, which may be reclaimed for field crops, by means detachably connected with the plow-beam and the forward end of the plow share; which serves not only as a coulter to score and to cut the sward, but also to undercut the surface soil on a plane, or approximately on the plane, with the lower edge of the plow-share, as preferred.

With the foregoing and other objects in view which will appear as the description proceeds, the invention further resides in the combination of parts and the details of construction hereinafter described and claimed, it being understood that changes may be made in the precise embodiment of the invention without departing from the spirit of the same.

In the accompanying drawings:

Figure 1 is an elevation, viewed from the moldboard side of the plow; showing the coulter connected with the forward end of the plow-share, and also with the plow-beam.

Figure 2 is a forward end elevation of the plow and the coulter, attached to a plow-beam of modified I-beam construction, shown in cross-section.

Figure 3 is a plan view of the plow and coulter.

Figure 4 is an enlarged cross-sectional detail, taken on line 1—1, of Figures 1 and 6, showing a fragment of the coulter.

Figure 5 is a side elevation, as viewed from the land side of the plow, showing the upper end of the coulter standard in dotted lines, connected with the plow-beam; and also a brace-rod and turnbuckle connection between the coulter standard and plow-beam, for adjustably securing the coulter to the forward end of the plow-share.

Figure 6 is an enlarged fragmentary detail view of the plow-share and the shoe of the coulter, showing in dotted lines a socket in the shoe to receive an inclined projecting end of the plow-share.

Figure 7 is an enlarged fragmentary plan view, showing the inclined projecting end of the plow-share.

Figure 8 is an enlarged detail plan view of the coulter blade in cross-section, showing in dotted lines a socket in the coulter shoe to receive the forwardly projecting end of the plow-share.

Referring now to the reference letters on the drawings, indicating the several parts of the invention;

A denotes the plow-beam, B a plow-share, M a moldboard, and C a coulter, secured at its upper end to the beam A, by a cross plate D, engaged by bolts E, extending through the plate and into the beam. The coulter C, has a forwardly extending shoe C', welded to the lower end of the coulter; and formed in the heel of the shoe is an inclined socket $C^2$, adapted to receive a slightly inclined extension B', projecting forwardly from the end of the moldboard and plow-share B, and upon fitting the shoe C' thereon, the sole of the shoe is on a plane, or substantially on the same plane as the lower edge of the plow-share. $C^3$ indicates a beveled cutting edge on the coulter for cutting the sward, which co-ordinates with the forwardly extending inclined end of the shoe C', that undercuts the surface soil on a plane with the lower edge of the plow-share B; preliminary to being directed by the moldboard M, into the furrow.

The plow-share B, at its forward end extends backwardly from the coulter C, on an angle to the plow-beam A; and due to the relatively long gradually inclined curved surface of the moldboard M, the surface sod is turned over face down into the furrow, as the plow is drawn forward by a tractor, or other power means (not shown).

A divided screw-threaded tie-rod F, is secured to the plow-beam A, by a clevis F", its opposite end being secured by a like clevis F", to the coulter C. A turnbuckle G connects the divided tie-rods F together, whereby upon a quick proper adjustment of the turnbuckle G, following the entry of the inclined extension B', into the socket $C^2$, in the heel of the shoe C'; the coulter and its shoe is fixedly secured to the projecting end of the plow-share B, until released for other work.

What I claim is:

In a plow, a plow beam having a downwardly extending rear portion, a plow share mounted horizontally upon the lower end of the said rear portion of the plow beam, a moldboard extending upwardly and rearwardly from the plow share, a pin projecting forwardly from the front end of said plow share in spaced relation to edges thereof, a coulter disposed vertically in front of the plow share and the moldboard and sharpened along its front edge and having its upper end secured to said plow beam, a horizontal shoe at the lower end of said coulter mounted under and projecting from opposite sides of the coulter and formed at its rear end with a socket located midway its width and into which the pin at the front end of the plow share snugly fits with portions of the front end of the plow share about the pin disposed in abutting engagement with the rear of said shoe, and a longitudinally adjustable brace extending between and secured to the coulter and to the downwardly extending rear portion of the plow beam above the moldboard and including a turn buckle tightened and preventing dislodgement of the pin from the socket.

HARRY E. NIELSEN.

REFERENCES CITED

The following references are of record in the file of this patent:

UNITED STATES PATENTS

| Number | Name | Date |
|---|---|---|
| Re. 4,965 | Gibbs | July 9, 1872 |
| 116,048 | Gibbs | June 20, 1871 |
| 213,188 | Goodyear | Mar. 11, 1879 |